(12) United States Patent
Senf, Jr.

(10) Patent No.: US 10,571,167 B2
(45) Date of Patent: Feb. 25, 2020

(54) TRANSPORTATION REFRIGERATION UNIT WITH MULTIPLE COMPRESSORS

(71) Applicant: Carrier Corporation, Farmington, CT (US)

(72) Inventor: Raymond L. Senf, Jr., Central Square, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/560,091

(22) PCT Filed: Mar. 15, 2016

(86) PCT No.: PCT/US2016/022404
§ 371 (c)(1),
(2) Date: Sep. 20, 2017

(87) PCT Pub. No.: WO2016/153841
PCT Pub. Date: Sep. 29, 2016

(65) Prior Publication Data
US 2018/0087813 A1    Mar. 29, 2018

Related U.S. Application Data

(60) Provisional application No. 62/135,877, filed on Mar. 20, 2015.

(51) Int. Cl.
*B60H 1/32*    (2006.01)
*F25B 27/00*    (2006.01)
(Continued)

(52) U.S. Cl.
CPC .............. *F25B 31/00* (2013.01); *B60H 1/323* (2013.01); *B60H 1/3223* (2013.01);
(Continued)

(58) Field of Classification Search
CPC ................ F25B 31/00; F25B 2400/054; F25B 2400/13; F25B 40/00; F25D 11/003; B60H 1/323; B60H 1/3223
See application file for complete search history.

(56) References Cited

U.S. PATENT DOCUMENTS

2,663,164 A    12/1953   Kurtz
3,386,262 A    6/1968    Hackbart et al.
(Continued)

FOREIGN PATENT DOCUMENTS

CN    2516413 Y      10/2002
DE    19708533 A1    9/1998
(Continued)

OTHER PUBLICATIONS

International Search Report for International Application No. PCT/US2016/022404; International Filing Date Mar. 15, 2016; dated Jun. 23, 2016; 4 Pages.
(Continued)

*Primary Examiner* — Ana M Vazquez
(74) *Attorney, Agent, or Firm* — Cantor Colburn LLP

(57) ABSTRACT

A transportation refrigeration unit includes an evaporator 32 circulating a flow of refrigerant therethrough to cool a flow of supply air flowing over the evaporator. Two compressors 36,38 are in fluid communication with the evaporator to compress the flow of refrigerant and are configured and connected to operate in parallel with one another. A condenser 44 is in fluid communication with the evaporator and the two compressors. An economizer heat exchanger 56 and a suction line heat exchanger 68 are provided.

13 Claims, 4 Drawing Sheets

(51) Int. Cl.
*F25B 31/00* (2006.01)
*F25B 40/00* (2006.01)
*F25D 11/00* (2006.01)

(52) U.S. Cl.
CPC ........... *B60H 1/3232* (2013.01); *F25B 27/00* (2013.01); *F25D 11/003* (2013.01); *F25B 40/00* (2013.01); *F25B 2327/001* (2013.01); *F25B 2400/054* (2013.01); *F25B 2400/0751* (2013.01); *F25B 2400/13* (2013.01)

(56) References Cited

U.S. PATENT DOCUMENTS

| | | | |
|---|---|---|---|
| 3,785,169 | A | 1/1974 | Gylland, Jr. |
| 3,866,433 | A | 2/1975 | Krug |
| 4,184,341 | A | 1/1980 | Friedman |
| 4,411,141 | A | 10/1983 | Hara |
| 4,418,548 | A | 12/1983 | Sawyer |
| 4,537,047 | A | 8/1985 | Seshadri et al. |
| 4,720,980 | A | 1/1988 | Howland |
| 4,729,228 | A | 3/1988 | Johnsen |
| 4,934,158 | A | 6/1990 | Sakano |
| 5,440,894 | A | 8/1995 | Schaeffer et al. |
| 5,743,102 | A | 4/1998 | Thomas et al. |
| 6,058,727 | A * | 5/2000 | Fraser, Jr. ............ F25B 31/002 62/190 |
| 2005/0257545 | A1 | 11/2005 | Ziehr et al. |
| 2010/0066133 | A1* | 3/2010 | Benton ............ B60H 1/00264 297/180.14 |
| 2010/0071391 | A1* | 3/2010 | Lifson ............ F25B 1/10 62/115 |
| 2010/0215516 | A1 | 8/2010 | Lifson et al. |
| 2011/0214439 | A1 | 9/2011 | Lifson et al. |
| 2012/0090342 | A1* | 4/2012 | Ikemiya ............ B60P 3/20 62/239 |
| 2013/0104582 | A1 | 5/2013 | Sandkoetter et al. |
| 2013/0145781 | A1* | 6/2013 | Liu ............ F25B 1/02 62/115 |
| 2013/0255286 | A1 | 10/2013 | Siegert |

FOREIGN PATENT DOCUMENTS

| | | |
|---|---|---|
| DE | 29816787 U1 | 1/2000 |
| DE | 29816787 U1 | 3/2000 |
| FR | 2960949 A1 | 12/2011 |
| WO | 2008079128 A1 | 7/2008 |
| WO | 2009048464 A1 | 4/2009 |

OTHER PUBLICATIONS

Written Opinion for International Application No. PCT/US2016/022404; International Filing Date Mar. 15, 2016; dated Jun. 23, 2016; 5 Pages.

Singapore Office Action Issued in SG Application No. 11201707320U, dated Aug. 28, 2018, 4 Pages.

* cited by examiner

TRANSPORTATION REFRIGERATION UNIT WITH MULTIPLE COMPRESSORS

CROSS REFERENCE TO RELATED APPLICATIONS

This application is a National Stage application of PCT/US2016/022404, filed Mar. 15, 2016, which claims the benefit of U.S. Provisional Application No. 62/135,877, filed Mar. 20, 2015, both of which are incorporated by reference in their entirety herein.

BACKGROUND OF THE INVENTION

The subject matter disclosed herein relates to refrigeration systems. More specifically, the subject matter disclosed herein relates to refrigeration of containers utilized to store and ship cargo.

A typical refrigerated cargo container or refrigerated truck trailer, such as those utilized to transport a cargo via sea, rail or road, is a container modified to include a refrigeration unit located at one end of the container. The refrigeration unit includes a compressor, condenser, expansion valve and evaporator serially connected by refrigerant lines in a closed refrigerant circuit in accord with known refrigerant vapor compression cycles. The evaporator is located in a compartment that requires cooling, such as a cargo compartment of a truck or trailer. The condenser and compressor are located outside of the compartment. Cargo compartment air is passed over the coils of the evaporator, boiling the refrigerant flowing through the evaporator coil, thus heat is absorbed from the air in the conditioned compartment to cool the conditioned compartment. The gaseous refrigerant is then flowed to the compressor for compression thereat. A power unit, including an engine, drives the compressor of the refrigeration unit, and is typically diesel powered, or in other applications natural gas powered. In many truck/trailer transport refrigeration systems, the compressor is driven by the engine shaft either through a belt drive or by a mechanical shaft-to-shaft link. In other systems, so-called "electrically driven" systems, the engine drives a generator that generates electrical power, which in turn drives the compressor.

Refrigerant R404A is popularly used in refrigeration and transport refrigeration applications, but is being phased out in many locations due to its high global warming potential (GWP). Potential replacement refrigerants for R404A, such as R407F or R448A, have shown equivalent performance to R404A at high and medium temperature refrigeration points (about 30 degrees Fahrenheit and above), but typically have 10-15% lower capacity than R404A at frozen goods refrigeration temperatures (about −30 degrees Fahrenheit). Additionally, the replacement refrigerants show higher compressor discharge temperatures compared to R404A.

Additional compressor displacement or speed is typically used to overcome the cooling capacity shortfall. Utilizing a single, larger compressor, and/or operating it at higher speeds decreases efficiency of the refrigeration system. Additionally, larger compressors often need to be throttled to maintain the high and medium refrigeration temperatures, at which point their performance worsens.

BRIEF DESCRIPTION OF THE INVENTION

In one embodiment, a transportation refrigeration unit includes an evaporator circulating a flow of refrigerant therethrough to cool a flow of supply air flowing over the evaporator. Two compressors are in fluid communication with the evaporator to compress the flow of refrigerant and are configured and connected to operate in parallel with one another. A condenser is in fluid communication with the evaporator and the two compressors.

Additionally or alternatively, in this or other embodiments at least one compressor of the two compressors is in fluid communication with an economizer heat exchanger.

Additionally or alternatively, in this or other embodiments a suction line heat exchanger is located fluidly downstream of the economizer heat exchanger.

Additionally or alternatively, in this or other embodiments a DC power storage unit is utilized to drive at least one compressor of the two compressors.

Additionally or alternatively, in this or other embodiments the DC power storage unit provides DC power to an evaporator fan and/or a condenser fan of the transportation refrigeration unit.

Additionally or alternatively, in this or other embodiments a first compressor of the two compressors has a first displacement unequal to a second displacement of a second compressor of the two compressors.

In another embodiment, a refrigerated cargo container includes a cargo compartment and a transportation refrigeration unit in fluid communication with the cargo compartment. The transportation refrigeration unit includes an evaporator circulating a flow of refrigerant therethrough to cool a flow of supply air flowing from the cargo compartment over the evaporator and two compressors in fluid communication with the evaporator to compress the flow of refrigerant. The two compressors are configured and connected to operate in parallel with one another. A condenser is in fluid communication with the evaporator and the two compressors.

Additionally or alternatively, in this or other embodiments at least one compressor of the two compressors is in fluid communication with an economizer heat exchanger.

Additionally or alternatively, in this or other embodiments a suction line heat exchanger is located fluidly downstream of the economizer heat exchanger.

Additionally or alternatively, in this or other embodiments a DC power storage unit is utilized to drive at least one compressor of the two compressors.

Additionally or alternatively, in this or other embodiments the DC power storage unit provides DC power to an evaporator fan and/or a condenser fan of the transportation refrigeration unit.

Additionally or alternatively, in this or other embodiments a first compressor of the two compressors has a first displacement unequal to a second displacement of a second compressor of the two compressors.

In yet another embodiment, a method of operating a transportation refrigeration unit includes flowing a liquid flow of refrigerant through an evaporator and directing a flow of supply air from a cargo compartment across the evaporator thus cooling the supply air and boiling the flow of refrigerant. The flow of refrigerant is routed from the evaporator to two compressors arranged in parallel and is injected into the two compressors at a compressor inlet of each compressor. The flow of refrigerant is compressed at the two compressors and is directed to the evaporator via a condenser.

Additionally or alternatively, in this or other embodiments the flow of refrigerant is routed through an economizer heat exchanger prior to flowing the flow of refrigerant through the evaporator and a portion of the flow of refrigerant is routed to at least one compressor of the two compressors, bypassing the evaporator. The portion of the flow of refrigerant is injected into at least one compressor of the two compressors at an intermediate compressor inlet disposed between the compressor inlet and the compressor outlet.

Additionally or alternatively, in this or other embodiments the flow of refrigerant is directed through a suction line heat exchanger disposed fluidly downstream of the economizer heat exchanger.

Additionally or alternatively, in this or other embodiments at least one compressor of the two compressors is operated via DC power from a DC power storage unit.

Additionally or alternatively, in this or other embodiments one or more of a condenser fan and an evaporator fan are operated via DC power from the DC power storage unit.

Additionally or alternatively, in this or other embodiments the flow of refrigerant through one compressor of the two compressors is stopped.

Additionally or alternatively, in this or other embodiments a first compressor of the two compressors has a first displacement unequal to a second displacement of a second compressor of the two compressors.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
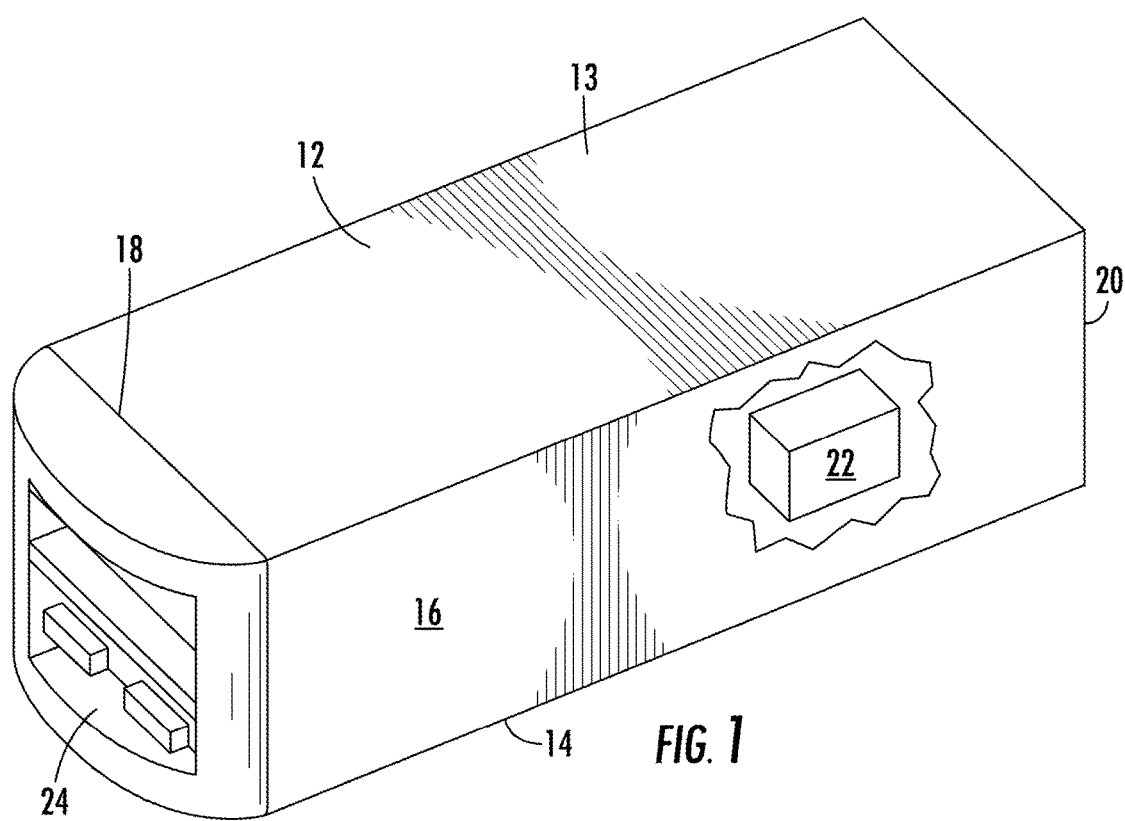
FIG. 1 is a schematic illustration of an embodiment of a refrigerated transportation cargo container.

Shown in FIG. 1 is an embodiment of a refrigerated cargo container 10. The cargo container 10 is formed into a generally rectangular construction, with a top wall 12, a directly opposed bottom wall 14, opposed side walls 16 and a front wall 18. The cargo container 10 further includes a door or doors (not shown) at a rear wall 20, opposite the front wall 18. The cargo container 10 is configured to maintain a cargo 22 located inside the cargo container 10 at a selected temperature through the use of a refrigeration unit 24 located at the container 10. The cargo container 10 is mobile and is utilized to transport the cargo 22 via, for example, a truck, a train or a ship. The refrigeration unit 24 is located at the front wall 18, and includes an evaporator 32 that receives an airflow 34 (shown in FIG. 2) from inside the cargo container 10 and cools it via thermal energy exchange between the airflow 34 and refrigerant flowing through the evaporator 32. The cooled airflow 34 is utilized to refrigerate the cargo compartment 10 to a selected temperature. In some embodiments, the selected temperature is in the range of about 30 to 50 degrees Fahrenheit for high or medium temperature refrigeration, while in other embodiments the selected temperature may be between 0 and −30 degrees Fahrenheit for frozen good refrigeration. It is to be appreciated that these temperatures are merely exemplary and that the refrigeration unit 24 described herein may be utilized to achieve a wide range of selected temperatures and further is readily switchable between selected temperatures.

Figure 2:
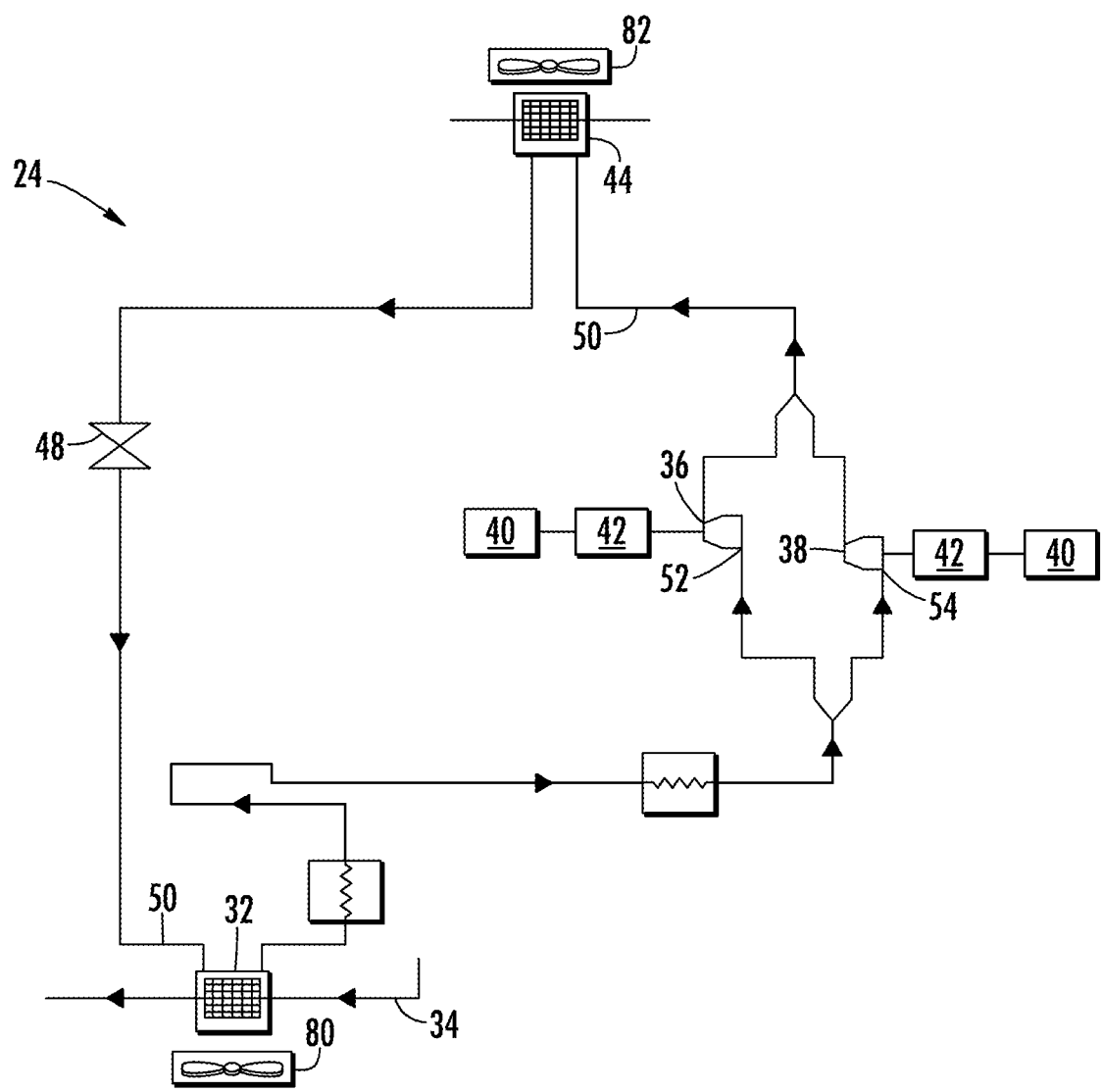
FIG. 2 is a schematic illustration of an embodiment of a refrigeration system for a refrigerated transportation cargo container.

Referring now to FIG. 2, a schematic illustration of an exemplary refrigeration unit 24 is shown. The refrigeration unit 24 includes two multiplexed compressors, first compressor 36 and second compressor 38 arranged in parallel. The compressors 36, 38 are smaller than typical transportation refrigeration compressors, and are in some embodiments about 4.5 cubic inches. The compressors 36, 38 may both be vapor injection scroll compressors, or may be compressors of different types. The compressors 36, 38 are powered by a power source, for example, a diesel-powered engine 40 either directly or via an intervening electrical generator 42 as shown to derive AC power to drive the compressors 36, 38. The compressors 36, 38 may be powered by the same engine 40 and generator 42 or may be individually powered via independent power sources.

As stated above, the compressors 36, 38 are arranged in parallel and are fluidly connected to a condenser 44. The compressors 36, 38 compress a vapor refrigerant flow 50, and the refrigerant flow 50 changes phase into liquid at the condenser 44. The condenser 44 is fluidly connected to an expansion device 48. The expansion device 48 is fluidly connected to the evaporator 32, where the airflow 34 is cooled and the refrigerant flow 50 is boiled through thermal energy exchange at the evaporator 32. The vaporized refrigerant flow 50 is then returned to first compressor inlet 52 and second compressor inlet 54 of the respective compressors 36, 38.

Figure 3:
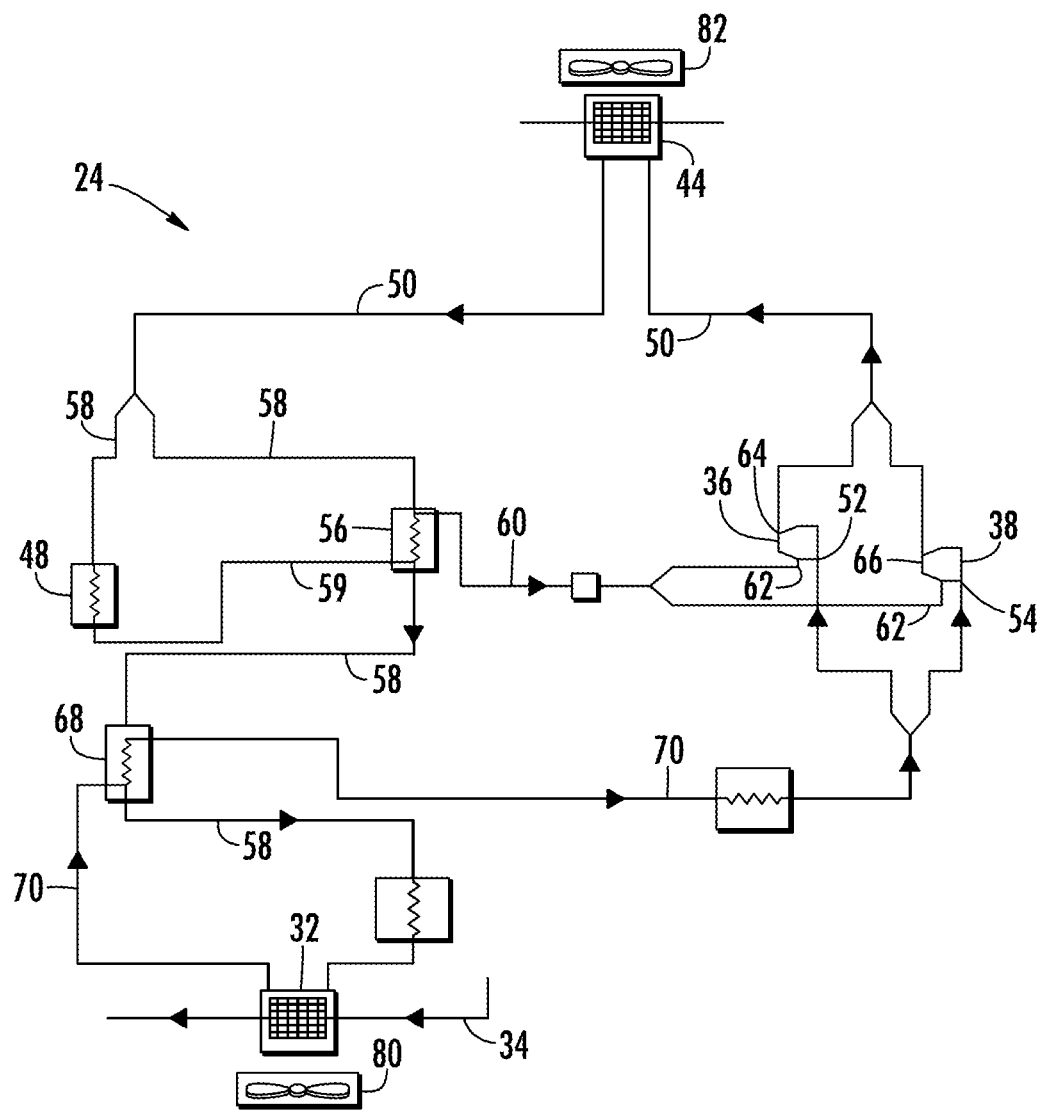
FIG. 3 is a schematic illustration of another embodiment of a refrigeration system for a refrigerated transportation cargo container.

Referring now to FIG. 3, the dual compressor refrigeration unit 24 is enhanced by the inclusion of one or more economizer heat exchangers located downstream of condenser 44. The refrigerant flow 50 is split into two liquid refrigerant flows, 58 and 59. Refrigerant flow 58 is directed through an economizer heat exchanger 56, while refrigerant flow 59 is directed through economizer expansion device 48 upstream of the economizer heat exchanger 56, where refrigerant flow 59 is expanded and cooled. Refrigerant flow 59 is then flowed through the economizer heat exchanger 56 to supercool refrigerant flow 58 before refrigerant flow 58 proceeds toward evaporator 32. Due to thermal energy exchange with refrigerant flow 58, refrigerant flow 59 is boiled at the economizer heat exchanger 56 into vapor refrigerant flow 60. The vapor refrigerant flow 60 is then delivered to compressor 36 and/or 38 and injected into the compressor 36, 38 at an intermediate compressor inlet 62 between the compressor inlets 52, 54 and compressor outlets 64, 66.

The subcooled liquid refrigerant flow 58 then flows toward the evaporator 32, optionally through a liquid to suction line heat exchanger 68 before entering the evaporator 32. At the liquid to suction line heat exchanger 68, the liquid refrigerant flow 58 is further subcooled by thermal exchange with evaporator output vapor refrigerant flow 70 to improve evaporator 32 capacity. Once passing through the evaporator 32 and boiling, the evaporator output vapor refrigerant flow 70 is, as stated, routed through the liquid to suction line heat exchanger 68 before continuing to the compressors 36, 38 where it is injected at compressor inlets 52, 54 of compressors 36, 38.

The system configuration of the present disclosure is switchable between several modes of operation as will be described below. In one operational mode, used, for example, for full cool frozen or pulldown medium temperature full cool operation, both compressors 36, 38 are operational. First compressor 36 is operating in economized mode, with intermediate compressor inlet 62 open. Second compressor 38, however, is operating in standard mode as a booster, with intermediate compressor inlet 62 closed. The refrigeration unit 24 realizes an enthalpy boost from the one economized cycle.

In other operational modes such as full cool deep frozen operation, where greater cooling capacity is needed, both compressors 36, 38 are operated in economized mode with intermediate compressor inlets 62 open. In still other modes, such as a high temperature pulldown with high power demand, or a perishable part load, only one compressor 36, 38 may be operated and may be throttled to match load.

In other embodiments, compressors 36, 38 may have displacements differing from one another, for example, compressor 36 may have two-thirds of the total displacement and compressor 38 may have one-third of the total displacement thus allowing more flexibility in capacity modulation to achieve peak refrigeration unit 24 efficiency. Additional multiplexing opportunities exist with the unequally-sized compressors 36, 38 and also offers additional simplicity and cost benefits.

Figure 4:
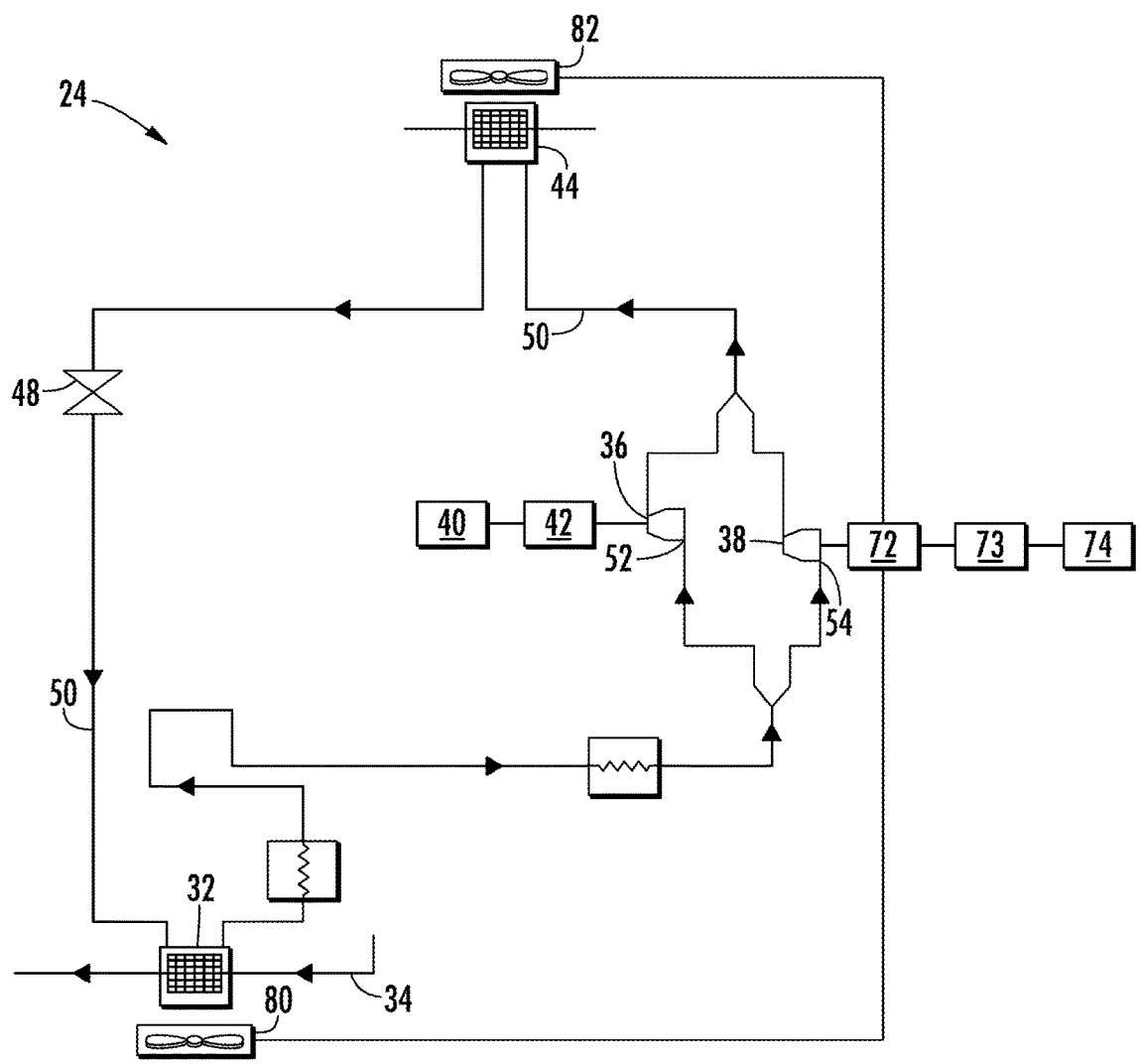
FIG. 4 is a schematic illustration of yet another embodiment of a refrigeration system for a refrigerated transportation cargo container.

In another embodiment, illustrated in FIG. 4, the first compressor 36 utilizes AC power via generator 42, while second compressor 38 utilizes DC power from DC power storage unit 72. Engine 74 drives DC power generator 76, which charges the DC power storage unit 72. In addition to driving the compressor 38, the DC power from the DC power storage unit 72 may be utilized to drive condenser fan 82 of the condenser 44 and/or evaporator fan 80 of the evaporator 32, as well as any additional electrically-powered components of the refrigeration unit 24 or cargo container 10. Operating the second compressor 38 via DC power allows the engine 74 to be operated only periodically to recharge the DC storage power unit 72, thus reducing refrigeration unit 24 fuel consumption.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transportation refrigeration unit comprising:
an evaporator circulating a flow of refrigerant therethrough to cool a flow of supply air flowing over the evaporator;
two compressors in fluid communication with the evaporator to compress the flow of refrigerant, the two compressors configured and connected to operate in parallel with one another;
a condenser in fluid communication with the evaporator and the two compressors;
an AC power generator operably connected to a first compressor of the two compressors, the AC power generator configured to drive the first compressor;
an engine operably connected to a DC power generator; and
a DC power storage unit operably connected to the DC power generator and to a second compressor of the two compressors, the DC power storage unit charged by the DC power generator, the second compressor driven by DC power stored in the DC power storage unit;
wherein the two compressors are operably connected to an economizer heat exchanger; and
wherein the transportation refrigeration unit is selectably operated in a first mode wherein a first compressor receives refrigerant flow from the economizer heat exchanger and a second compressor of the two compressors does not, and is selectably switchable to a second mode wherein both the first compressor and the second compressor receive refrigerant flow from the economizer heat exchanger.

2. The transportation refrigeration unit of claim 1, further comprising a suction line heat exchanger disposed fluidly downstream of the economizer heat exchanger.

3. The transportation refrigeration unit of claim 1, wherein the DC power storage unit provides DC power to an evaporator fan and/or a condenser fan of the transportation refrigeration unit.

4. The transportation refrigeration unit of claim 1, wherein the first compressor of the two compressors has a first displacement unequal to a second displacement of the second compressor of the two compressors.

5. A refrigerated cargo container comprising:
a cargo compartment; and
a transportation refrigeration unit in fluid communication with the cargo compartment including:
an evaporator circulating a flow of refrigerant therethrough to cool a flow of supply air flowing from the cargo compartment over the evaporator;
two compressors in fluid communication with the evaporator to compress the flow of refrigerant, the two compressors configured and connected to operate in parallel with one another;
a condenser in fluid communication with the evaporator and the two compressors;
an AC power generator operably connected to a first compressor of the two compressors, the AC power generator configured to drive the first compressor;
an engine operably connected to a DC power generator; and
a DC power storage unit operably connected to the DC power generator and to a second compressor of the two compressors, the C power storage unit charged by the DC power generator, the second compressor driven by DC power stored in the DC power storage unit;
wherein the two compressors are operably connected to an economizer heat exchanger; and
wherein the transportation refrigeration unit is selectably operated in a first mode wherein a first compressor receives refrigerant flow from the economizer heat exchanger and a second compressor of the two compressors does not, and is selectably switchable to a second mode wherein both the first compressor and the second compressor receive refrigerant flow from the economizer heat exchanger.

6. The refrigerated cargo container of claim 5, further comprising a suction line heat exchanger disposed fluidly downstream of the economizer heat exchanger.

7. The refrigerated cargo container of claim 5, wherein the DC power storage unit provides DC power to an evaporator fan and/or a condenser fan of the transportation refrigeration unit.

8. The refrigerated cargo container of claim 5, wherein the first compressor of the two compressors has a first displacement unequal to a second displacement of the second compressor of the two compressors.

9. A method of operating a transportation refrigeration unit comprising:
    flowing a liquid flow of refrigerant through an evaporator;
    directing a flow of supply air from a cargo compartment across the evaporator thus cooling the supply air and boiling the flow of refrigerant;
    routing the flow of refrigerant from the evaporator to two compressors arranged in parallel;
    injecting the flow of refrigerant into the two compressors at a compressor inlet of each compressor;
    compressing the flow of refrigerant at the two compressors;
    directing the flow of refrigerant to the evaporator via a condenser;
    driving a first compressor of the two compressors via an AC power generator operably connected to the first compressor;
    driving a DC power generator via an engine operably connected to the DC power generator;
    charging a DC power storage unit via the DC power generator; and
    driving a second compressor of the two compressors via the DC power storage unit; selectably operating the transportation refrigeration unit in a first mode including:
    routing the flow of refrigerant through an economizer heat exchanger prior to flowing the flow of refrigerant through the evaporator; and
    routing a portion of the flow of refrigerant to only one compressor of the two compressors, bypassing the evaporator; and
    injecting the portion of the flow of refrigerant into the one compressor of the two compressors at an intermediate compressor inlet disposed between the compressor inlet and a compressor outlet; and selectably switching operation to a second mode, including:
    routing the portion of the flow of refrigerant to both compressors of the two compressors, bypassing the evaporator; and
    injecting the portion of the flow of refrigerant into both compressors of the two compressors at an intermediate compressor inlet disposed between the compressor inlet and the compressor outlet.

10. The method of claim 9, further comprising directing the flow of refrigerant through a suction line heat exchanger disposed fluidly downstream of the economizer heat exchanger.

11. The method of claim 9, further comprising operating one or more of a condenser fan and an evaporator fan via DC power from the DC power storage unit.

12. The method of claim 9, further comprising stopping the flow of refrigerant through one compressor of the two compressors.

13. The method of claim 9, wherein the first compressor of the two compressors has a first displacement unequal to a second displacement of the second compressor of the two compressors.

* * * * *